(12) United States Patent
Grinnell et al.

(10) Patent No.: US 9,888,710 B2
(45) Date of Patent: Feb. 13, 2018

(54) METHOD FOR PRODUCING COOKED EGG PRODUCT HAVING IRREGULAR SHAPED EGG CURDS

(71) Applicant: CARGILL, INCORPORATED, Wayzata, MN (US)

(72) Inventors: Steve Grinnell, Montrose, MN (US); Donald Andrew Moss, Elk River, MN (US); Donald R. Roberts, St. Michael, MN (US); Theresa Wagner, Maple Lake, MN (US)

(73) Assignee: Cargill, Incorporated, Wayzata, MN (US)

( * ) Notice: Subject to any disclaimer, the term of this patent is extended or adjusted under 35 U.S.C. 154(b) by 254 days.

(21) Appl. No.: 14/677,041

(22) Filed: Apr. 2, 2015

(65) Prior Publication Data

US 2015/0282515 A1 Oct. 8, 2015

Related U.S. Application Data

(60) Provisional application No. 61/975,281, filed on Apr. 4, 2014.

(51) Int. Cl.
*A23L 1/32* (2006.01)
*A23L 5/10* (2016.01)
*A23L 15/00* (2016.01)

(52) U.S. Cl.
CPC .................. *A23L 1/32* (2013.01); *A23L 5/15* (2016.08); *A23L 15/00* (2016.08); *A23L 15/20* (2016.08); *A23L 15/30* (2016.08); *A23V 2002/00* (2013.01)

(58) Field of Classification Search
CPC .......... A23L 15/00; A23L 15/20; A23L 15/30; A23L 5/15; A23L 1/32; A23L 1/01; A23V 2002/00
See application file for complete search history.

(56) References Cited

U.S. PATENT DOCUMENTS 3,264,974 A * 8/1966 Miller ................. A47J 29/00
99/423
3,646,880 A * 3/1972 Norris ................. A47J 37/044
219/244
3,714,888 A * 2/1973 Tanguy ............... A47J 37/044
99/355

(Continued)

FOREIGN PATENT DOCUMENTS

JP 2005295842 * 10/2005

OTHER PUBLICATIONS

English Translation for JP2005295842 published Oct. 2005.*

*Primary Examiner* — Anthony Weier (57) ABSTRACT

Provided are methods of manufacturing a cooked egg product having irregular shaped egg curds similar in shape, size, and mouthfeel to that of freshly cooked scrambled eggs. Liquid egg product is optionally first preheated then transferred to a belt oven and cooked to form a layer of cooked egg product. The layer of cooked egg product is then transported through an agitator, which initially breaks down the layer of cooked egg product, and subsequently is passed through a forming plate to shape the cooked egg product into irregular shaped egg curds similar in appearance to that of freshly cooked scrambled eggs. This process allows for a simplified ingredient deck and reduces the number of fines present in the final product.

16 Claims, 4 Drawing Sheets

(56) References Cited

U.S. PATENT DOCUMENTS

| | | | | |
|---|---|---|---|---|
| 4,862,793 A | * | 9/1989 | Steiner | A47J 37/10 |
| | | | | 426/614 |
| RE43,136 E | * | 1/2012 | Mathews | 426/100 |
| 2002/0058098 A1 | * | 5/2002 | Knipper | A23L 15/00 |
| | | | | 426/614 |
| 2003/0091711 A1 | * | 5/2003 | Sanderson | A23L 15/00 |
| | | | | 426/510 |
| 2012/0009312 A1 | * | 1/2012 | Lee | A23L 15/00 |
| | | | | 426/301 |

* cited by examiner

METHOD FOR PRODUCING COOKED EGG PRODUCT HAVING IRREGULAR SHAPED EGG CURDS

CROSS-REFERENCE TO RELATED APPLICATIONS

This application claims priority to U.S. Provisional Patent Application No. 61/975,281 entitled "Method for Producing Cooked Egg Product Having Irregular Shaped Egg Curds," filed on Apr. 4, 2014; the contents of which are hereby incorporated by reference.

FIELD

This disclosure relates to methods of producing a cooked egg product having irregular shaped egg curds similar in appearance and mouthfeel to that of freshly scrambled eggs.

BACKGROUND

Improvements to food products can include, for example, improving the mouthfeel, flavor, look, and/or shelf-life of a product, reducing calories, and keeping raw material production costs low. To achieve these improvements in food products, food manufacturers may seek to modify the method of manufacturing, which can impart improved qualities in an improved or more efficient manner. At the same time, however, the appetizing nature and overall appearance of the food product should be maintained or even enhanced. Additionally, food manufacturers may also seek ways to produce naturally-sourced and clean-label food products to satisfy increasing consumer demand for healthy and natural foods.

SUMMARY

In one embodiment, provided is a method of producing a cooked egg product having irregular shaped egg curds. The method may comprise preheating liquid egg product to a temperature ranging from about 40° F. to about 150° F.; cooking the preheated liquid egg product to a temperature ranging from about 160° F. to about 200° F. on a belt grill to create a layer of cooked egg product; transporting the layer of cooked egg product through a machine comprising an agitator, wherein the agitator breaks down the layer of cooked egg product; and passing the broken down cooked egg product through a forming plate, defining a plurality of orifices, to form individual egg curds as a final egg product. The final egg product comprises less than 10 wt % fines.

In certain embodiments, the liquid egg product comprises at least about 50 wt % of whole egg. The liquid egg product may further comprise one or more of the following ingredients: egg whites, water, oil, starch, dried milk (or other diary substances), isolated soy protein, dried egg whites, salt, gum, flavor, citric acid (or other organic acids), anti-foam, annatto (or other coloring agents), and plant-based fiber.

In certain embodiments, the liquid egg product comprises at least about 75 wt % of egg whites. The liquid egg product may further comprise one or more of the following ingredients: water, oil, starch, dried milk (or other diary substances), isolated soy protein, dried egg whites, salt, gum, flavor, citric acid (or other organic acids), anti-foam, annatto (or other coloring agents), and plant-based fiber.

In certain embodiments, the final egg product comprises between about 0.5 wt % and about 3 wt % fines.

In certain embodiments, the final egg product comprises between about 0.5 wt % and about 2.5 wt % fines.

In certain embodiments, the final egg product is of a residual temperature ranging from about 160° F. to about 200° F.

In certain embodiments, the method may further comprise chilling or quick freezing the final egg product.

DETAILED DESCRIPTION

The present disclosure provides methods of producing a cooked egg product having irregular shaped egg curds similar in appearance, size, and mouthfeel to freshly prepared scrambled eggs. The methods disclosed herein also provide opportunities for the removal of ingredients to simplify the ingredient deck as well as produce a higher quality product.

Egg Products

Egg products useful in embodiments of the present application may include whole egg, egg white, egg yolk, egg substitute, egg powder, imitation egg, and combinations thereof.

As used herein, the term "whole egg" means a mixture of egg white and yolk. The whole egg may, but does not necessarily, include egg white and egg yolk in a ratio recognized as the ratio of yolk to white in eggshells. Whole egg products can include other optional ingredients as described below.

As used herein, the term "egg white" means egg white obtained after separating the white and the yolk by breaking fresh eggs, and as such, the egg white is substantially free of egg yolk. The egg white can be used in the disclosed products that can comprise other optional ingredients as described below.

As used herein, the term "egg yolk" means egg yolk obtained after separating the white and the yolk by breaking fresh eggs, and as such, the egg yolk is substantially free of egg white. The egg yolk can be used in the disclosed products that can comprise other optional ingredients as described below.

As used herein, the term "egg substitute" refers to egg substitute products, such as those available commercially under the trade name EGGBEATERS (ConAgra Foods, Inc., Omaha, Nebr., USA).

As used herein, the term "egg powder" refers to dehydrated whole egg, dehydrated egg white, dehydrated egg yolk, and combinations thereof. The term "reconstituted egg powder" refers to egg powder to which water has been added.

As used herein, the term "imitation egg" refers to food-grade products having similar functional properties of egg but derived primarily from plant-based sources.

As used herein, the term "liquid egg product" means liquid whole egg, liquid egg white, liquid egg yolk, liquid egg substitute, reconstituted egg powder, liquid imitation egg, or any combination of the above along with any other ingredients defined herein, but not limited to the ingredients listed below.

The disclosed liquid egg products used to produce egg products can be pasteurized with or without additional ingredients, mixed with additional ingredients, and heated to form various food products. The order of mixing and heating can be varied depending upon the desired egg product. An example of additional ingredients that may be used is plant fiber or plant-sourced fiber, which refers to an edible fiber (i.e., dietary fiber) obtained from a plant source, for example, a fruit, a grain, a seed, or a vegetable. Examples of plant fiber and plant-sourced fiber may be found in International Application WO/2014/124101.

The liquid egg product used to produce egg products can be pasteurized in a manner consistent with the International Egg Pasteurization Manual (Froning, G. W., et. al, United Egg Association, Alpharetta, Ga., 2002), the disclosure of which is hereby incorporated by reference in its entirety. Typically, the liquid egg product can be pasteurized to reduce the number of viable microbes initially present in the liquid egg product.

Overview of Process

Figure 1:
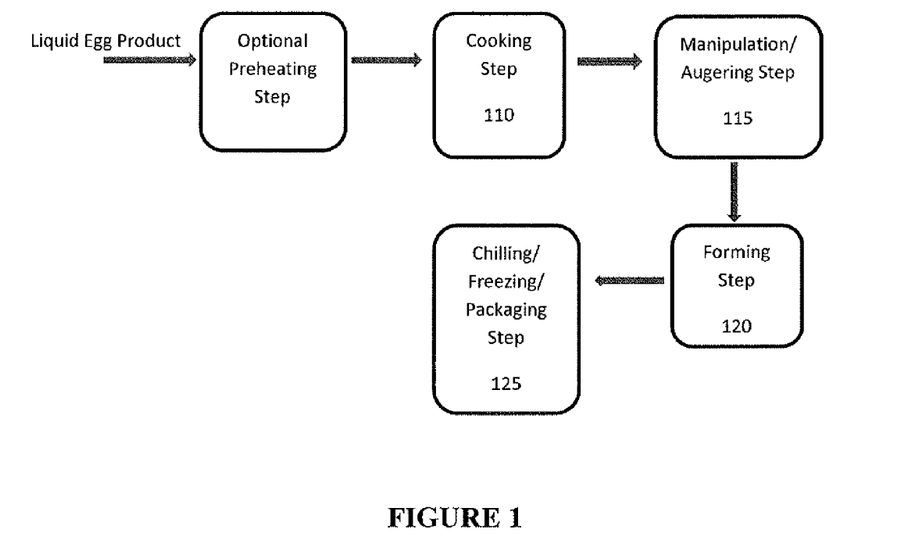
FIG. 1 illustrates an embodiment of the process flow for producing a cooked scrambled egg product.
Figure 2:
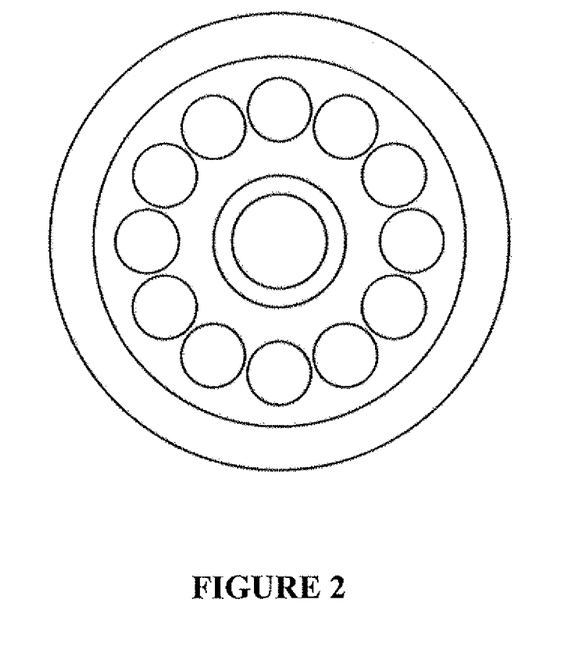
FIG. 2 illustrates a forming plate having uniform circular orifices that may be used in the present invention.
Figure 3:
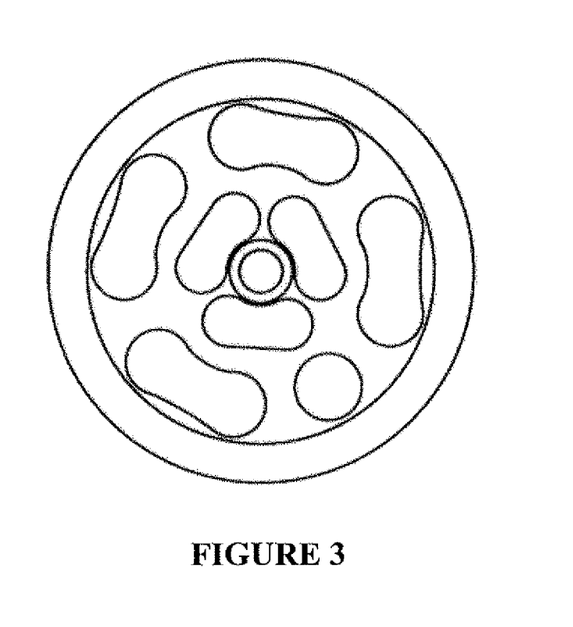
FIG. 3 illustrates a forming plate having non-uniform orifices that may be used in the present invention.
Figure 4:
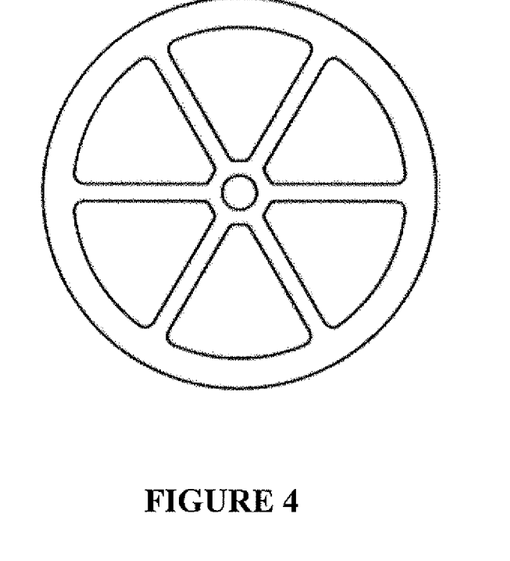
FIG. 4 illustrates a forming plate having uniform triangular orifices that may be used in the present invention.
Figure 5:
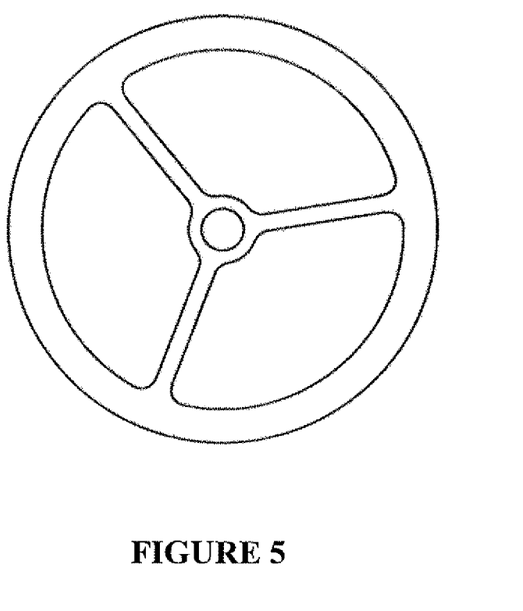
FIG. 5 illustrates a forming plate having uniform triangular orifices that may be used in the present invention.

Referring to FIG. 1, there is shown an overview of an embodiment of the present invention. In general aspects of the present invention, liquid egg product is first preheated (105). After the preheating step, the liquid egg product is transferred to a belt oven and cooked to form a layer of cooked egg product (110). The layer of cooked egg product is then transported through a machine having an agitation means, which initially breaks down the layer of cooked egg product (115). After the agitation step, the cooked egg product is pushed through a forming plate to form the cooked egg product into irregular shaped egg curds similar in appearance to that of freshly cooked scrambled eggs (120). After the formation of the irregular shaped egg curds, the final egg product may be chilled or individually quick frozen and packaged (125). In certain embodiments, inclusions, such as such as vegetables, meat products, nut and grains, and mixtures thereof, can be mixed in before or during the cooking process, post chill or post individual quick freezing.

Unexpectedly, this process allows for the removal of certain ingredients used in conventional egg processing methods, thus allowing for a more simplified ingredient deck and a reduction in the amount of fines present in the final product.

Cooking the Egg Product

In certain aspects, liquid egg product is optionally first preheated to a temperature less than a cooking temperature for the liquid egg product. The temperature is sufficiently high enough to prevent heat shock of the liquid egg product and prevent non-uniformity in texture in the finished egg product. In certain embodiments, the liquid egg product is preheated to a temperature ranging from about 40° F. to about 150° F., more preferably from about 110° F. to about 150° F., and more preferably from about 120° F. to about 140° F., and even more preferably from about 125° F. to about 135° F. The initial heating may be accomplished using any type of heat exchanger as known in the art for this purpose.

After the optional preheating step, the liquid egg product is transferred to a belt oven, wherein the belt oven preferably has a Teflon® coating, and is heated to provide a homogenously heated egg product. This further heating brings the egg to a temperature which is effective for cooking the egg product. In certain embodiments, the liquid egg product is heated on the belt oven to a temperature ranging from about 160° F. to about 200° F. To achieve this heating, the belt oven is heated to a temperature ranging from about 200° F. to about 240° F. This heating process provides a cooked egg product that is sufficiently cooked to allow egg protein to coagulate and provide a final cooked egg product having a homogenous firmness and texture similar to that of freshly cooked scrambled eggs. Cooking the liquid egg product on the belt oven creates a layer of cooked egg having a relatively uniform thickness.

Forming the Egg Product

The layer of cooked egg product is then transported through an elongated machine having an agitation means. In certain embodiments, a Vemag vacuum stuffer machine having a twin-screw auger may be used as the agitator machine. In certain embodiments, a Handtmann vane cell feed system may be used as the agitator machine. In certain embodiments, a Marlen twin piston pumping system may be used as the agitator machine.

In certain embodiments, the agitation means may be a single-screw. In other embodiments, the agitation means is preferably a double screw. Examples of single and double screw augers that may be used in this process are sold by Robert Reiser & Co., Inc.

The layer of cooked egg product is essentially stuffed and folded into the agitation machine and the agitation means initially breaks down the layer of cooked egg product into individual pieces unique in shape and size. A benefit to this process is that the egg is fully cooked before it is disturbed/manipulated which eliminates interference with the gelling and coagulation properties of cooking egg.

Because the layer of cooked egg product is sent directly to the agitation machine after the cooking step, it is transported through the agitation machine at a warm temperature because residual heat from the cooking step remains within the egg product. No additional temperature or pressure is added to the agitation machine which allows for more delicate handling of the egg product.

The speed at which the cooked egg product is transported through the agitation machine may be manipulated as desired, understanding that too slow of a speed may not break down the layer of cooked egg enough before curd formation and too fast of a speed may break down the layer of cooked enough too much before curd formation. Further, the size of the agitation machine may also be manipulated as desired.

Disposed at the end of the agitation machine is a forming plate that defines a plurality of orifices. The agitated egg product is extruded through the plurality of openings thereby forming irregular shaped egg curds similar in appearance to that of freshly cooked scrambled eggs.

Figure 6:
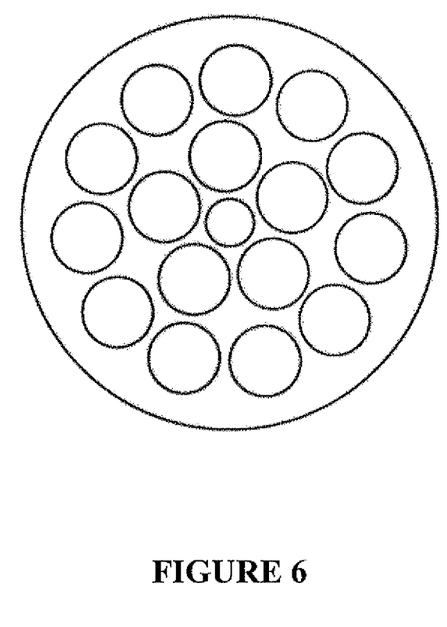
FIG. 6 illustrates a forming plate having uniform circular orifices that may be used in the present invention.

The forming plate may take the form of many different shapes and sizes. Referring to FIGS. 2-6, there are shown certain embodiments that may be used. Preferably, the forming plate defining a plurality of circular orifices illustrated in FIG. 6 is used.

As the irregular shaped egg curds exit the system, they contain a residual temperature ranging from about 160° F. to about 200° F. Accordingly, the egg curds subsequently may be chilled or individually quick frozen and packaged. Inclusions, such as vegetables, meat products, nut and grains, and mixtures thereof may also be added to the egg curds as desired.

Because additional pressure is not intentionally added to the system (recognizing that some level of pressure will inherently be added due to the overall process), the overall process of manufacturing the cooked egg product is more delicate than conventional methods previously used. Consequently, this delicate handling imparts very little damage to the egg curds exiting the system, which reduces the level of fines in the final product, allows for a more simplified ingredient deck, and works successfully for whole egg, egg white, and substitute or imitation egg applications.

Formulation

Due to the delicate handling of the egg product, the formulation used for the liquid egg product may be simplified as the amount of fillers (e.g., texturizing agents) and additional proteins typically used in conventional manufacturing processes to provide structural integrity are not needed in the formulations of the present invention.

Unexpectedly, this process works just as well for egg white formulations as it does for whole egg formulations. Egg whites typically have a more delicate protein structure, therefore additional ingredients, such as dried egg whites and relatively large amounts of texturizing ingredients (e.g., starches and gums) are typically added to enhance the structural integrity of the egg white during processing. However, because of the delicate handling of this system, in certain aspects, an egg white formulation having a simplified ingredient deck may be used in this process.

In certain aspects, whole egg formulations of the present invention comprise at least 50 wt % of whole egg, more preferably at least 80 wt % of whole egg, and more preferably at least 85 wt % of whole egg. Further, in certain aspects, whole egg formulations may additionally include one of more of the following ingredients: whole egg, egg whites, water, oil, starch, dried milk (or other dairy substances), isolated soy protein, dried egg whites, salt, gum, flavor, citric acid (or other organic acids), anti-foam, annatto (or other coloring agents), and plant-based fiber.

In certain aspects, egg white formulations of the present invention comprise at least 75 wt % of egg whites, more preferably at least 80 wt % of egg whites, and more preferably at least 85 wt % of egg whites. Further, in certain aspects, egg white formulations may additionally include one of more of the following ingredients: water, oil, starch, dried milk (or other dairy substances), isolated soy protein, dried egg whites, salt, gum, flavor, citric acid (or other organic acids), anti-foam, annatto (or other coloring agents), and plant-based fiber.

Level of Fines

Again, due to the delicate handling of the egg product, the amount of fines is reduced when compared to conventional processing methods. As used herein, the term "fines" is defined as a cooked egg piece in the final product that is smaller than about 0.11 inches. In conventional processing methods, the amount of fines in the final cooked egg product make up at least about 3.5 wt % and in some instances, make up about 6 wt % to about 7 wt % of the final product, but in all instances make up 10 wt % or less of the final product.

In certain embodiments of the present invention, the amount of fines in the final cooked egg product is less than 10 wt %, less than 8 wt %, and less than 6 wt %. Depending on the egg formulation and the processing equipment, the level of fines may range from about 0.5 wt % to about 3 wt % of the final product. Even more typically, the amount of fines in the final product ranges from about 2 wt % to about 3 wt % of the final product, and even more typically from about 2 wt % to about 2.5 wt %.

End-Use Applications

The final cooked egg product may come in both frozen and refrigerated (chilled) versions. Further, the final cooked egg product may be incorporated into diverse food products such as, for example, breakfast scrambles (including cheese, meat, and/or vegetable, etc., inclusions), breakfast burritos, breakfast sandwiches, or stand alone as a scrambled egg product.

EXAMPLES

Aspects of certain embodiments in accordance with aspects of the disclosure are illustrated in the following Examples. The formulations, materials, and/or methods described in these Examples are illustrative and not intended to be limiting.

Example 1: Whole Egg Formulations

A variety of whole egg formulations are used in this process and are detailed in Table 1. In these formulations, whole egg comprises at least 50 wt % of the total formulation.

TABLE 1

| Ingredients | Formulation 1 (wt %) | Formulation 2 (wt %) | Formulation 3 (wt %) | Formulation 4 (wt %) |
| --- | --- | --- | --- | --- |
| Whole Egg | 89-99% | 85-95% | 80-90% | 50-60% |
| Egg White | | | 0.1-10% | |
| Water | | 0.1-10% | 0.1-10% | 35-40% |
| Oil | | 0.1-10% | | 0.1-10% |
| Starch | 0.1-5.0% | 0.1-5.0% | 0.1-5.0% | 0.1-5.0% |
| Dried Milk | | 0.1-5.0% | | 0.1-5.0% |
| Isolated Soy Protein | | | | |
| Dried Egg Whites | | | 0.0-5.0% | |
| Salt | 0.01-2.0% | 0.01-2.0% | | 0.01-2.0% |
| Gum | 0.01-2.0% | 0.01-2.0% | 0.01-2.0% | 0.01-2.0% |
| Flavor | | 0.01-2.0% | | 0.01-2.0% |
| Citric Acid | 0.001-1.0% | 0.001-1.0% | | 0.001-1.0% |
| Anti Foam | | | | |
| Annatto | | | 0.001-1.0% | |
| Fiber | | | | 0.01-2.0% |

Example 2: Egg White Formulations

Egg white formulations are also used in this process and an example of such formulation is detailed in Table 2. In this formulation, egg whites comprise at least 81 wt % of the total formulation.

TABLE 2

| Ingredients | Formulation 1 (wt %) | Formulation 2 (wt %) |
| --- | --- | --- |
| Whole Egg | | |
| Egg White | 89-99% | 81-91% |
| Water | | 0.1-10% |
| Oil | | 0.1-10% |
| Starch | 0.1-5.0% | 0.1-5.0% |
| Dried Milk | | 0.1-5.0% |
| Isolated Soy Protein | | 0.0-5.0% |
| Dried Egg Whites | | 0.0-5.0% |
| Salt | 0.01-2.0% | 0.01-2.0% |
| Gum | 0.01-2.0% | 0.01-2.0% |

TABLE 2-continued

| Ingredients | Formulation 1 (wt %) | Formulation 2 (wt %) |
|---|---|---|
| Flavor | | 0.01-2.0% |
| Citric Acid | | |
| Anti Foam | 0.001-1.0% | 0.001-1.0% |
| Annatto | | |

Example 3: Measuring Amount of Fines

Using whole egg formulation #2 in Table 2, the liquid egg product is cooked according to the parameters set forth herein and extruded through the forming plate illustrated in FIG. 6. A sample batch of final egg product comprising irregular shaped egg curds is placed in a Ro-Tap® Test Sieve Shaker comprising four screens made by Fischer Scientific: sized one inch, ½ inch, 5/16 inch, and 0.11 inches, respectively. The egg product trapped on each screen is weighed using a scale and converted into weight percent. Finally, the level of fines (i.e., egg product not trapped by a sieve screen) are also weighed and converted into weight percent.

Refer to Table 3 for the results of two sieve tests. As shown, the amount of fines in the sample batch of final egg product ranges between 2 wt % and 2.5 wt %

TABLE 3

| Piece Size | 1" (wt %) | ½" (wt %) | 5/16" (wt %) | #7 (wt %) | Fines (wt %) |
|---|---|---|---|---|---|
| Sieve 1 | 0 | 53.25 | 26.27 | 18.09 | 2.39 |
| Sieve 2 | 0.21 | 71.1 | 17.04 | 9.58 | 2.04 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a meat" includes two or more different meats. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of manufacturing a cooked egg product, comprising:
    preheating liquid egg product to a temperature ranging from about 40° F. to about 150° F.;
    cooking the preheated liquid egg product to a temperature ranging from about 160° F. to about 200° F. on a belt oven to create a layer of fully cooked egg product;
    transporting the layer of cooked egg product through a machine comprising an agitator, wherein the agitator breaks down the layer of fully cooked egg product; and
    passing the broken down fully cooked egg product through a forming plate, said forming plate defining a plurality of orifices, to form individual egg curds as a final egg product;
    wherein the final egg product is at a residual temperature ranging from about 160° F. to about 200° F. as the fully cooked egg product passes through the forming plate, and
    wherein the final egg product comprises less than 10 wt % of fines.

2. The method of claim 1, wherein the liquid egg product comprises at least about 50 wt % of whole egg.

3. The method of claim 2, wherein the liquid egg product further comprises one or more of the following ingredients: egg whites, water, oil, starch, a dairy substance, isolated soy protein, dried egg whites, salt, gum, flavor, organic acid, anti-foam, coloring agent, and plant-based fiber.

4. The method of claim 1, wherein the liquid egg product comprises at least about 75 wt % of egg whites.

5. The method of claim 4, wherein the liquid egg product further comprises one or more of the following ingredients: water, oil, starch, a dairy substance, isolated soy protein, dried egg whites, salt, gum, flavor, organic acid, anti-foam, coloring agent, and plant-based fiber.

6. The method of claim 1, wherein the final egg product comprises between about 0.5 wt % and about 3 wt % of fines.

7. The method of claim 1, wherein the final egg product comprises between about 0.5 wt % and about 2.5 wt % of fines.

8. The method of claim 1, further comprising chilling or quick freezing the final egg product.

9. A method of manufacturing a cooked egg product, comprising:
    cooking liquid egg product to a temperature ranging from about 160° F. to about 200° F. on a belt oven to create a layer of fully cooked egg product;
    transporting the layer of fully cooked egg product through a machine comprising an agitator, wherein the agitator breaks down the layer of fully cooked egg product; and
    passing the broken down fully cooked egg product through a forming plate, said forming plate defining a plurality of orifices, to form individual egg curds as a final egg product;
    wherein the final egg product is at a residual temperature ranging from about 160° F. to about 200° F. as the fully cooked egg product passes through the forming plate, and
    wherein the final egg product comprises less than about 10 wt % of fines.

10. The method of claim 9, wherein the final egg product comprises less than about 3 wt % of fines.

11. The method of claim 9, wherein the liquid egg product comprises at least about 50 wt % of whole egg.

12. The method of claim 11, wherein the liquid egg product further comprises one or more of the following ingredients: egg whites, water, oil, starch, a dairy substance, isolated soy protein, dried egg whites, salt, gum, flavor, organic acid, anti-foam, coloring agent, and plant-based fiber.

13. The method of claim 9, wherein the liquid egg product comprises at least about 75 wt % of egg whites.

14. The method of claim 13, wherein the liquid egg product further comprises one or more of the following ingredients: water, oil, starch, a dairy substance, isolated soy protein, dried egg whites, salt, gum, flavor, organic acid, anti-foam, coloring agent, and plant-based fiber.

15. The method of claim 9, wherein the final egg product comprises between about 0.5 wt % and about 2.5 wt % of fines.

16. The method of claim 9, further comprising chilling or quick freezing the final egg product.

* * * * *